(12) United States Patent  
Eide

(10) Patent No.: US 7,740,287 B2  
(45) Date of Patent: Jun. 22, 2010

(54) FLEXIBLE JOINT FOR CRYOGENIC PIPE

(75) Inventor: Jørgen Eide, Fana (NO)

(73) Assignee: Framo Engineering AS, Bergen (NO)

( * ) Notice: Subject to any disclaimer, the term of this patent is extended or adjusted under 35 U.S.C. 154(b) by 91 days.

(21) Appl. No.: 11/883,124

(22) PCT Filed: Jan. 24, 2006

(86) PCT No.: PCT/NO2006/000030

§ 371 (c)(1),
(2), (4) Date: Apr. 1, 2008

(87) PCT Pub. No.: WO2006/080852

PCT Pub. Date: Aug. 3, 2006

(65) Prior Publication Data

US 2009/0115187 A1    May 7, 2009

(30) Foreign Application Priority Data

Jan. 25, 2005   (NO) .................................. 20050388

(51) Int. Cl.
*F16L 27/04* (2006.01)
(52) U.S. Cl. ...................... 285/261; 285/904
(58) Field of Classification Search .............. 285/261, 285/270, 267, 224, 226, 904
See application file for complete search history.

(56) References Cited

U.S. PATENT DOCUMENTS

| | | | | |
|---|---|---|---|---|
| 1,821,274 A | * | 9/1931 | Plummer | 285/261 |
| 3,722,926 A | * | 3/1973 | Fukushima | 285/261 |
| 4,455,108 A | * | 6/1984 | Lausberg | 285/261 |
| 5,048,873 A | * | 9/1991 | Allread et al. | 285/261 |
| 6,328,347 B1 | | 12/2001 | Reder et al. | |
| 7,503,590 B2 | * | 3/2009 | Challender et al. | 285/261 |

FOREIGN PATENT DOCUMENTS

| | | |
|---|---|---|
| EP | 0 718 537 A1 | 6/1996 |
| FR | 1 244 446 | 9/1959 |
| GB | 1 381 902 | 1/1975 |
| GB | 2 337 568 A | 11/1999 |

\* cited by examiner

*Primary Examiner*—David E Bochna
(74) *Attorney, Agent, or Firm*—Merchant & Gould P.C.

(57) ABSTRACT

A flexible joint for transfer of especially a cryogenic fluid includes a first element (3) and a second element (4). The first element (3) comprising an internal, partly curved surface (6), the second element (4) comprising a corresponding outer partly curved surface (8) with at least a sealing element (12, 12') between the curved surfaces (6,8). The first element (3) comprises a first connection part (9) and the second element comprises a second connection part (10) connectable to the first connection part (9) with a flexible part (11, 11') between the connection of the two connectable parts (9,10) and the sealing element (12). Thereby it is formed a void (16) which may be pressurized with an inert gas at a pressure equal to or higher than the pressure of the fluid to be transferred through the joint.

10 Claims, 2 Drawing Sheets

FLEXIBLE JOINT FOR CRYOGENIC PIPE

FIELD OF THE INVENTION

The present invention regards a flexible joint for transferral of a fluid, for instance a cryogenic fluid.

BACKGROUND

A cryogenic fluid, typically LPG or LNG, has a very low temperature at ambient pressure when stored as a liquid. If this liquid is spilled at or in a vessel all equipment in the vicinity of the spilled liquid will be cooled down to the boiling temperature of the liquid, which for LPG can be typically −50 degrees C. and for LNG typically −164 degrees C. Most vessels and equipment are built of carbon steel that will turn brittle and loose its structural strength at cryogenic temperatures.

The cryogenic liquid is maintained at or close to its boiling point at low temperature and any contact with other materials at a higher temperature will result in transfer of heat from that material to the liquid with consequently boil-off of liquid and cool down of the material. The liquid is therefore normally stored in well insulated pipes and tanks and all transfer is carried out with dedicated equipment and according to predetermined and approved procedures to reduce the risk of spill and accidents.

When transferring a cryogenic fluid there is in several cases a need for a flexible joint for the fluid transfer channel. Having a joint gives the potential hazard of spillage of the fluid, having a flexible joint gives an increased risk of spillage since any seal in the flexible joint will experience a dynamic situation.

When transferring a cryogenic fluid or other hazardous fluid, this involves a potential risk for personnel in the vicinity of the joint. Any human exposure to the fluid, as liquid or cold gas may result in serious injury or death. Protection of personnel can be achieved by either prohibiting personnel to enter the area when cold media is present and can leak out, or by use of adequate protective equipment. At this time protective equipment is limited to space suits and similar clothing which by nature is either prohibitive expensive or not available at such sites. As a general rule personnel should therefore not be admitted to enclosed space where there is a possibility that for instance LNG may escape (from for instance rotating equipment or flanged connections). Equipment inside such space must therefore be remotely operated and monitored and all containers with cryogenic liquid must be drained and inerted before personnel can enter.

However, there is a need for a flexible joint for transferral of a for instance cryogenic fluid, which gives increased safety. There are known some flexible joints for instance described in GB1381902 or GB2337568. However, these known solutions do not give the needed flexibility and security. There are also described flexible joints in EP 0718537 and U.S. Pat. No. 6,328,347.

An object of the present invention is to provide a flexible joint for transfer of a fluid as for instance a cryogenic fluid, which is safer in case of spillage. It is an object to provide a joint with flexibility about more than one axis. It is a further object to provide a joint without spillage of the transferred fluid.

The joint as defined in the accompanying claims fulfils the above mentioned object.

SUMMARY

The present invention regards a flexible joint for transfer of a fluid, for instance a cryogenic fluid. The joint comprises a first element and a second element each able to be connected to respective fluid transfer elements. The first and second element may also form an end part of respective fluid transfer elements. The first element comprises a first through going opening comprising an internal, partly curved surface. The curved surface may be doubly curved or partly spherical. The curved surface may preferably have a centre axis coaxial with a longitudinal axis of the through going opening, but can have a centre axis perpendicular to the longitudinal axis of the joint. The second element comprises a second through going opening and an outer partly curved surface corresponding to the internal curved surface of the first element. The curved surfaces are provided with at least a sealing element between the curved surfaces and the first and second through going openings are in communication with each other. According to the invention the first element comprises a first connection part and the second element comprises a second connection part connectable to the first connection part forming a sealed connection between the two connectable parts, where there is provided a flexible part between the connection of the two connectable parts and the sealing element between the curved surfaces on one or both sides of the connection between the two connectable parts. This construction forms, when connected, a void between the sealing connection between the connectable parts and the sealing element in the curved surfaces. According to the invention a void between two sealing devices is pressurized with an inert gas at a pressure equal to or higher than the pressure of the fluid to be transferred through the joint. The void may also function as a secure collecting void in the case of a spillage across the sealing elements.

The provision of a flexible element in the connection gives that the curved surfaces may move relative to each other and the sealing element experiences a dynamic situation, while the sealing connection between the connectable parts forms a static connection.

In one embodiment of the invention the curved surfaces are doubly curved and in the preferred embodiment partly spherical.

There is in one embodiment of the invention at least two sealing elements in the curved surfaces, and or at least one sealing member in the sealing connection between the connectable parts. Sealing means should in this application be considered to cover both sealing members and sealing element. There may in one embodiment be added an inert gas in between at least two of the sealing elements/members, at a pressure equal to or higher than the pressure of the fluid transferred through the flexible joint. Between two sealing elements/members should be understood to involve between two sealing members in the sealing connection of the connectable parts, between a sealing member in the sealing connection and a sealing element in the curved surfaces, i.e the void, or between two sealing elements in the curved surfaces.

The flexible part of the connection is in an embodiment formed of a "Cryodyn flex" material, i.e. a flexible double mantled, corrugated, vacuum insulated pipe part, made of non corrosive material, for instance AISI 316C. There may of course be other materials or configurations suitable for use in the flexible part of the joint.

In a preferred embodiment the connectable parts forms flanges, which preferably are joined with a joining elements for instance bolts running through the flanges and with at least a sealing member between the flanges.

In a preferred embodiment the first connectable part is a first flange formed of the first element, the second connectable part is a second flange attached to the second elements through the flexible part. Where preferably the first flange is formed mainly outside the inner spherical surface and the second flange is connected to the second element by a flexible, tubular formed element with a longitudinal axis mainly parallel with a longitudinal axis of the joint and a radial oriented fastening flange attached to or formed by the second element. The radial fastening flange preferably, is positioned in a distance from the outer curved surface of the second element.

BRIEF DESCRIPTION OF THE DRAWINGS

The invention will now be explained in more detail with reference to the accompanying drawings where.

DETAILED DESCRIPTION

Figure 1:
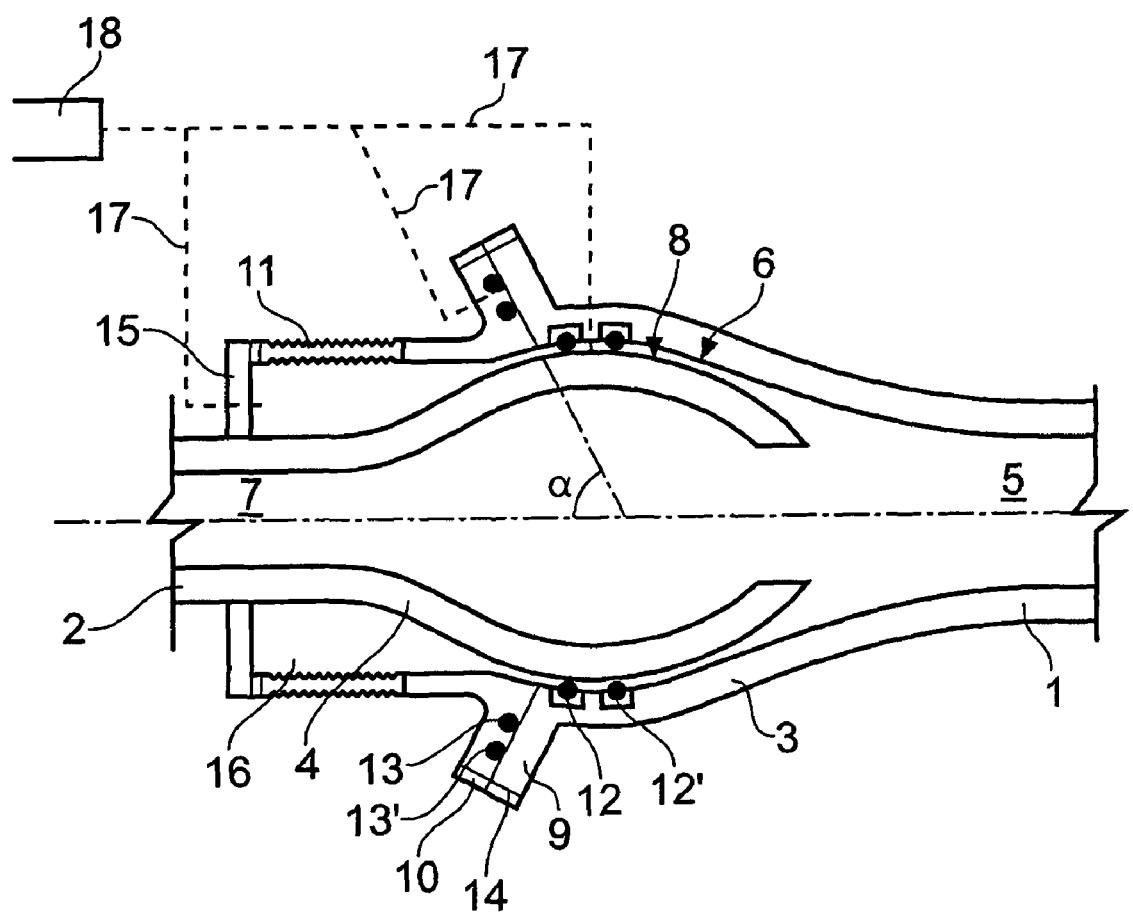
FIG. 1 shows a flexible joint in a preferred embodiment of the invention.

For clarity, elements with similar functions in the three embodiments are referred to with the same reference numerals in all three embodiments.

FIG. 1 shows a preferred embodiment of the invention. The joint comprises a first fluid transfer element 1 joined with a first element 3 of the flexible joint and a second fluid transfer element 2 joined with a second element 4 of the flexible joint. The first element 3 comprises a through going opening 5 comprising an internal curved surface 6. The second element 4 comprises a through going opening 7 and an outer curved surface 8. There is between the curved surfaces 6, 8 in this embodiment two sealing elements 12, 12'.

The joint comprises in addition according to the invention a first connection part 9 as a part of the first element 3, and a second connection part 10 as a part of the second element 4. The two connection parts 9, 10, in a joined configuration of the joint, form a sealed connection between them. In the shown embodiment there are also two sealing members 13, 13' between the two connecting parts 9, 10.

The second connecting part 10 forms a part of the second element 4 with a flexible part 11 between the second connecting part and the second through going opening 7. This configuration forms a void 16 between the sealed connection of the connectable parts 9, 10 and the sealing elements 12, 12' positioned between the curved surfaces 6, 8.

The curved surfaces 6, 8 are in the preferred embodiment doubly curved, i.e partly spherical which gives flexibility about three perpendicular axis. One may envisages single curved surfaces which gives flexibility about only one axis and the axis being parallel or perpendicular to the longitudinal axis of the joint. The curved surfaces, 6, 8 have in the preferred embodiment in a cross section, a more elliptic form, i.e. with changing curvature in the longitudinal direction of the joint. The curved surfaces may in one embodiment have a more partly spherical form. The first and second element 3,4 with the curved surfaces 6,8 are in the preferred embodiment formed with a more or less constant thickness of the material, this is beneficial but not a necessity. Other matters as for instance a requirement for less pressure loss in the fluid over the joint may give need for a more constant cross section for the fluid channel through the joint.

The connecting parts 9, 10 are in this embodiment formed as flanges, with two sealing members 13, 13' positioned in the joining of the connecting parts 9, 10. The connecting parts 9, 10 are held together by a securing device 14, which for instance may be a bolt. The flanges 9, 10 are given an angular orientation forming the angle a with the longitudinal axis of the joint, and kept right angled in relation to the partly spherical surface. By this one may have the sealing member in a rotational centre, while maintaining good strengths in the connection. The flexible part 11 forms a tubular element with a centre axis parallel with the longitudinal axis of the joint. The flexible part is joined with the second connectable part 10 in one end and with a radial extending fastening flange 15 in the other end. The first connectable part 9, forming a flange, is positioned outside the curved surface, at the end of the first element 3 which faces the second element 4. The second connectable part 10 forms at its radial innermost points, an extension of the first elements 3, inner curved surface 6.

There may as indicated in the figure be provided fluid lines 17 for adding a fluid into the void 16 from a source 18, in between sealing elements 12, 12' positioned in between the curved surfaces 6, 8 or in between sealing members 13, 13' in the sealed connection of the connectable parts 9, 10. This fluid functions as a sealing fluid and may be added into one, all or a combination of the positions indicated above. The fluid may be added with a pressure similar to or larger than the pressure of the fluid to be transported through the joint. The source 18 may be an external source or the transferred fluid itself for instance with a pressure booster in the fluid line or it may be different sources for the different positions.

With or without using a sealing fluid in any of the positions, having the void 16 gives a possibility to detect leakage of the transferred fluid across the sealing elements 12, 12' and even have a security preventing the leakage spilling on personnel or other equipment positioned around the joint. Using a sealing fluid at any of the positions gives an increased security, and if it is added with a positive pressure compared with the transferred fluid, the sealing fluid will leak into the transferred fluid and not the other way. By this, one may easily monitor if there is a leakage across the joint by the reduction in pressure/amount of sealing fluid in the system alternatively sensors in the void for detecting leakage. There may of course be sensors for detecting several of these elements in the system. There may be added a similar fluid into all the positions or different fluids to different positions. This may be the case since the different sealing member/elements experiences different conditions, the sealing elements 12, 12' are dynamic seals while the sealing members 13, 13' are static seals.

Figure 2:
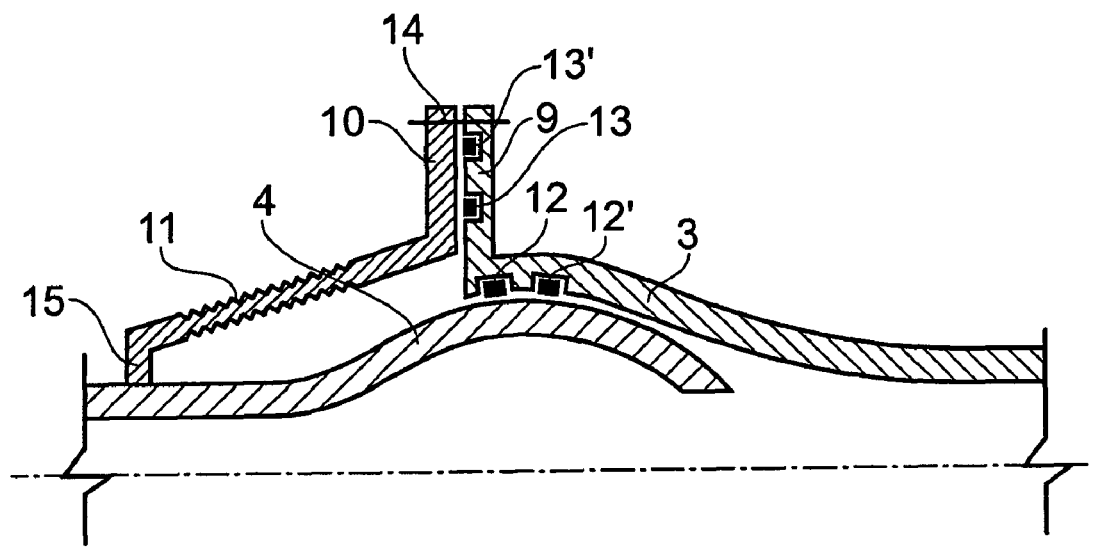
FIG. 2 shows a second embodiment of a flexible joint.
Figure 3:
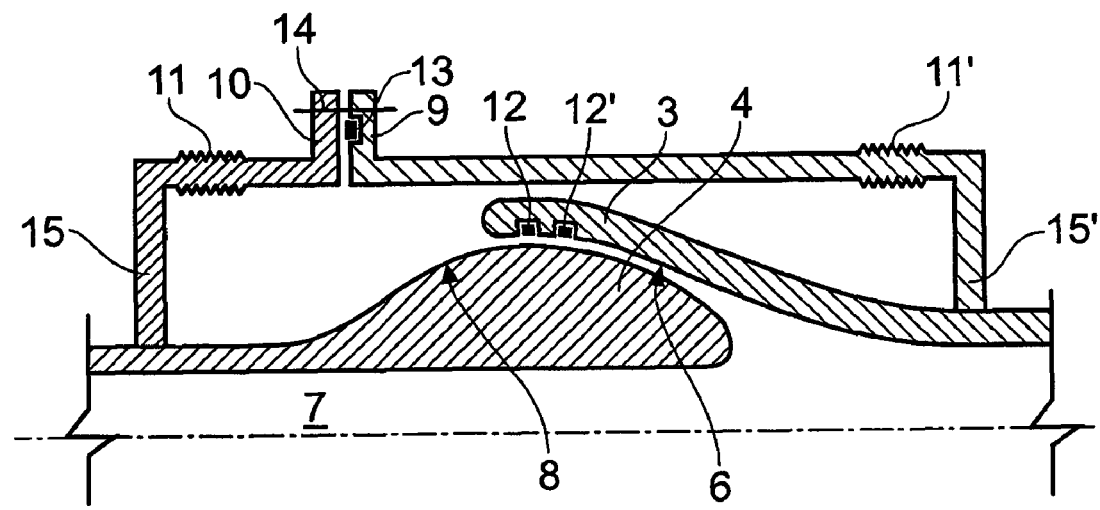
FIG. 3 shows a third embodiment of a flexible joint.

There are of course other embodiments of the invention within the scope of the invention as defined in the accompanying claims. Two possible embodiments are shown in FIG. 2 and FIG. 3. We will only explain the elements in these embodiments that differ from the embodiment described with reference to FIG. 1.

In FIG. 2 the connectable parts 9, 10 are in this embodiment radial extending flanges. The flexible element 11 is in the form of a truncated cone extending from the radial extending fastening flange 15.

In FIG. 3 the through going opening 7 has a constant cross section, and the second element 4 therefore has a varying thickness in the material forming the second element 4. The first connecting part 9 is connected to the first elements by a tubular element comprising a second flexible element 11' and attached to the first element 3 by a radial extending second fastening flange 15' attached to the first element 3 in a distance from the curved surface 6. The joining of the connectable parts 9, 10 are also done in a distance from the curved surfaces 6,8.

The invention has now been explained with detailed embodiments. There may of course be envisages several alterations and modifications of the embodiments described that fall within the scope of the invention as defined in the accompanying claims. The through going channels may be formed differently, the curved surfaces may have different forms depending on use and degree of wanted flexibility, there may be different flexible elements to give the necessary flexibility of the joint. There may be triple sealing elements in the curved surfaces, the connectable parts may be a threaded connection, etc.

The invention claimed is:

1. Flexible joint for transfer of a fluid, for instance a cryogenic fluid, comprising a first element and a second element each able to be connected to respective fluid transfer elements, the first element comprising a first through going opening comprising an internal curved surface, the second element comprising a second through going opening and an outer curved surface corresponding to the internal curved surface of the first element and the first and second through going openings are in communication with each other, wherein:
   (a) the first element comprises a first connection part and the second element comprises a second connection part connected to the first connection part forming a sealed connection between the first connection part and the second connection part,
   (b) at least one of the first element or the second element comprises a flexible part,
   (c) at least one sealing element provided between the curved surfaces,
   (d) at least one sealing element provided between the first connection part and the second connection part forming the sealed connection,
   (e) a void between the sealed connection and the at least one sealing element provided between the curved surfaces, and
   (f) an inert gas, in the void, at a pressure equal to or higher than the pressure of the fluid to be transferred through the joint.

2. Flexible joint according to claim 1, wherein the curved surfaces are doubly curved or partly spherical.

3. Flexible joint according to claim 1, wherein the curved surfaces are partly spherical.

4. Flexible joint according to claim 1, wherein there are at least two sealing elements between the curved surfaces, and at least one sealing element between the connection parts.

5. Flexible joint according to claim 1, wherein there are at least two sealing elements between the curved surfaces.

6. Flexible joint according to claim 1, wherein there are at least two sealing members between the connection parts.

7. Flexible joint according to claim 1, wherein the connection parts are flanges.

8. Flexible joint according to claim 1, wherein the first connection parts is a first flange of the first element, the second connection part is a second flange attached to the second element through the flexible part.

9. Flexible joint according to claim 8, wherein the first flange is formed mainly outside the inner curved surface and the second flange is connected to the second element by a flexible element with a longitudinal axis mainly parallel with a longitudinal axis of the joint and a radially oriented fastening flange attached to the second element.

10. Flexible joint according to claim 9, wherein radially oriented fastening flange is positioned a distance from the outer curved surface of the second element.

* * * * *